United States Patent

[11] 3,540,378

| | | | |
|---|---|---|---|
| [72] | Inventor | Francois Louis Giraud<br>Plaisir, France | |
| [21] | Appl. No. | 795,495 | |
| [22] | Filed | Jan. 31, 1969 | |
| [45] | Patented | Nov. 17, 1970 | |
| [73] | Assignee | Societe De L'Aerotrain<br>Paris, France,<br>a company of France | |
| [32] | Priority | March 19, 1968 | |
| [33] | | France | |
| [31] | | 144,391 | |

[54] FLUIDIC TRACK FOR GROUND-EFFECT TRANSPORTATION
16 Claims, 7 Drawing Figs.

[52] U.S. Cl. .................................................. 104/23
[51] Int. Cl. ....................................... B60v 1/06,
B60v 1/12

[50] Field of Search........................................... 104/23,
23FS

[56] References Cited
UNITED STATES PATENTS

| 319,335 | 6/1885 | Smith .......................... | 104/23FS |
| 2,918,183 | 12/1959 | Petersen...................... | 104/23FS |

*Primary Examiner*—Arthur L. La Point
*Assistant Examiner*—D. W. Keen
*Attorney*—Stevens, Davis, Miller & Mosher ABSTRACT: A fluidic track for ground-effect transportation has a multiplicity of valve-controlled discharge nozzles fed with pressure fluid tapped from a supply main through a succession of subplenums communicating with said supply main through throttled passages designed for hindering recharge of said plenums with pressure fluid from said supply main.

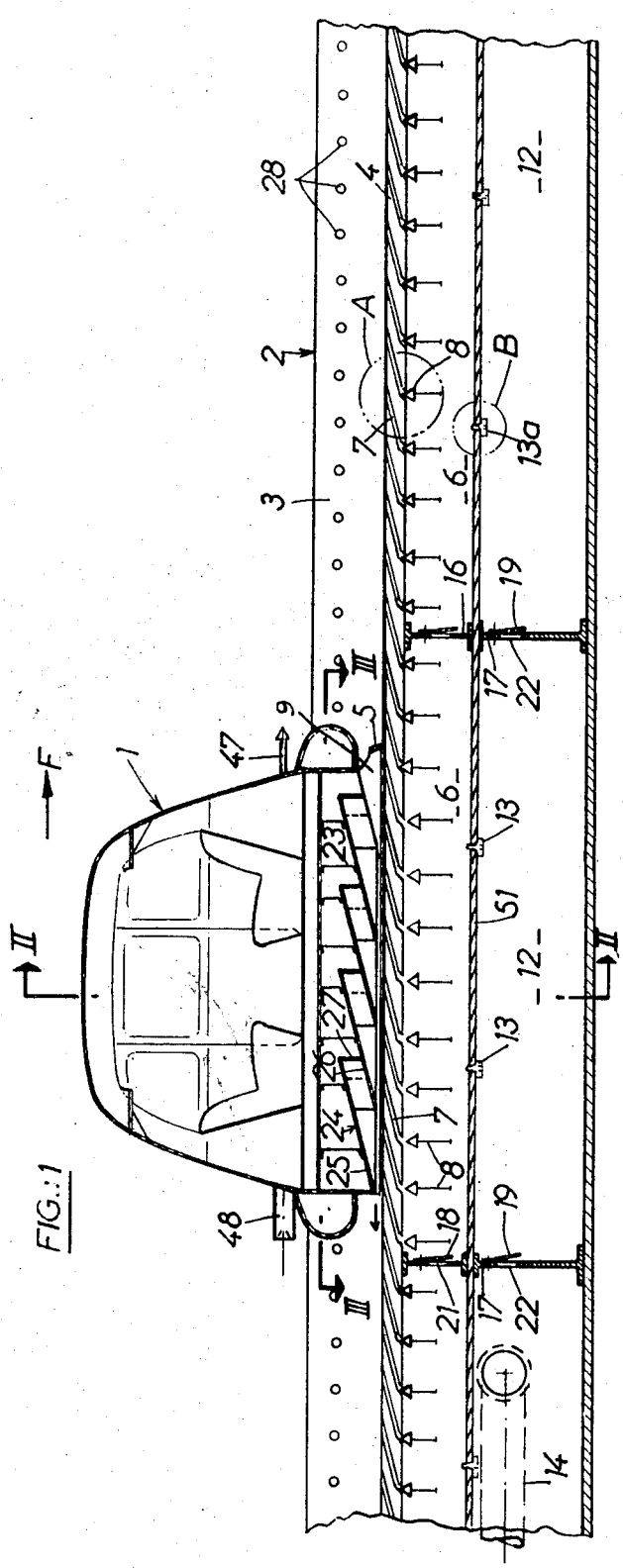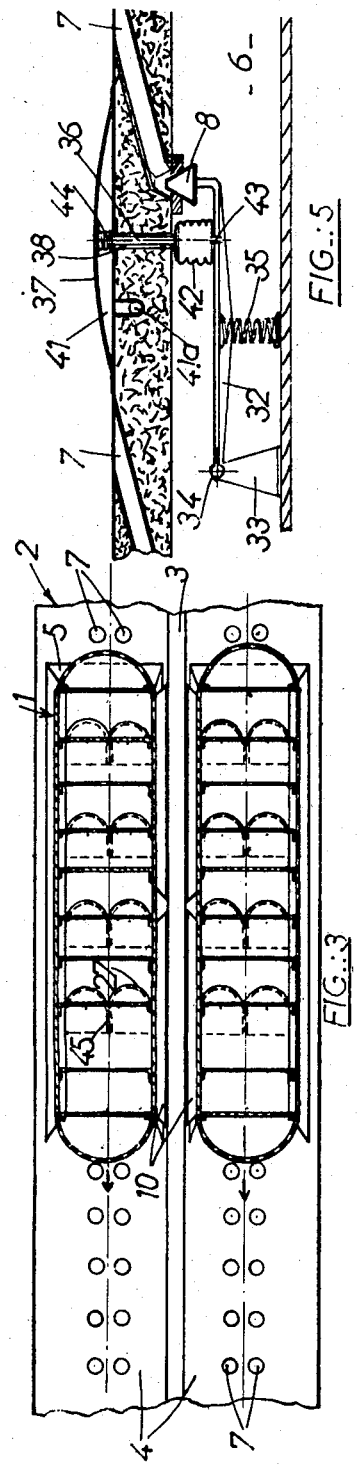

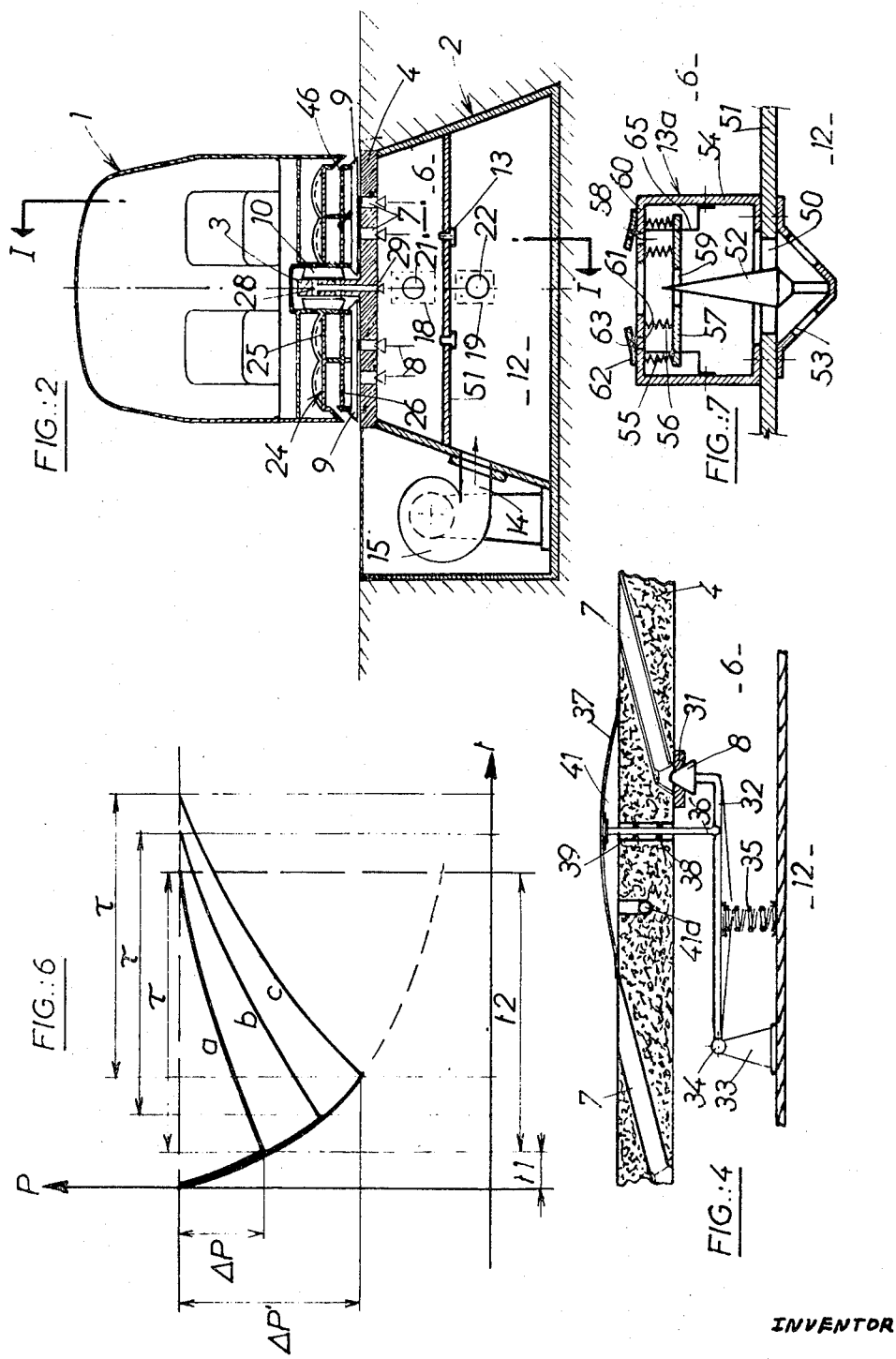

3,540,378

FLUIDIC TRACK FOR GROUND-EFFECT TRANSPORTATION

Ground effect transportation systems are known in which a machine moves along a prepared track through the medium of cushions of pressurised fluid generated by a source located inside the machine, in other words, there is provided a track which has no power source itself whilst the movable body or carriage carries the apparatus necessary for the generation of the ground effect.

Also known are systems of the reverse kind wherein, unlike the arrangements just described, it is the movable body which is the passive element and is reduced now either to the payload which is to be transported or to a simple cabin or platform to carry the payload, this time the track itself being the active element and being equipped with the arrangements for generating the ground effect, in particular a ducting arrangement which distributes pressurised fluid through multiple discharge orifices spaced at intervals along the track and controlled by obturator devices designed so that only those orifices which at a given instant are located opposite the movable body, are in fact open, the others remaining closed in order to avoid any unnecessary loss of fluid.

The present invention relates to inverted ground effect systems of this kind and in the following description the term "movable body" or "carriage" will be employed to designate the passive element carrying the payload, and the term "fluidic track" to designate the active track which supplies a layer or cushion of pressurised fluid.

The invention relates more particularly to a fluidic track with which there is combined a supply duct arrangement receiving the pressurised fluid from a compressor or other source, and delivering said fluid to the discharge orifices through the medium of subplenum arrangements or the like with which said pressure fluid supply duct or main communicates via calibrated orifices or orifices whose area is variable as a function of the pressure difference between the main and the subplenum chambers, so that after discharge of a subplenum chamber following the opening of the corresponding orifices, the recharging of said subplenum is delayed for a time determined by said communicating orifices. Thus, when a subplenum carries out its function of providing the ground effect required by a moving body or assembly of coupled moving bodies passing over it, the pressure inside said subplenum decreases in proportion to the number of coupled moving bodies and it requires a certain time of recharging in order to be able afresh to carry out said function with the same effect. It is incapable of doing this right from the start, to a degree which decreases progressively as time passes, so that any other movable body which happens to arrive level with it will receive a ground effect which is less than that which it requires for its continued movement, and it will therefore be decelerated or even halted.

The case will be the same if the discharge orifices for the pressurised fluid are inclined in relation to the surface along which the movable body is displacing, so that the jets of fluid issuing from them tend to counteract the forward movement of said movable body. It goes without saying that a movable body, which happens to arrive too close to a previous one, will only benefit to a lesser degree from the force of the jets which the first movable body has experienced.

It will readily be understood that in this way the possibility of collision of two successive movable bodies is entirely eliminated without it having been necessary to take any precaution or make any disposition in this direction, since the pressure in an active section of the track is, after the passage of a movable body, less than the pressure initially prevailing, and since a certain time must inevitably elapse before the same pressure level is regained.

In a preferred embodiment of a track of this kind in accordance with the invention, the subplenum chambers are linked with one another through nonreturn valves so arranged that the fluid supplied can only progress from one subplenum to the next, in the direction of displacement of the movable body.

As a variant on this or in supplement, the pressure fluid supply main combined with the track may be subdivided into successive segments respectively associated with the subplenum chambers, these segments communicating with one another through nonreturn valves arranged to allow progression of the fluid in the direction of displacement of the movable body, the main being supplied at points spaced at long intervals along it.

The track in accordance with the invention and designed in this fashion, will advantageously be made up of hollow profiled sections, prefabricated or otherwise, so designed as to present externally the requisite portions for the lifting and guidance of the movable bodies, and for form internally two superimposed compartments, one to do duty as the said subplenum discharge chambers and the other to do duty as the said pressure fluid supply main, said compartments being separated by a transverse partition in which said calibrated restricted orifices or variable-section restricted orifices are formed.

In accordance with a preferred embodiment of such a track, its elements, made for example of concrete or metal, will have a generally trapezoidal right section, the lift and guidance sections forming the shorter top portion of the trapezium, parallel to the base, and the partition, separating the subplenum chambers from the fluid pressure supply main, forming a basal portion intermediate of the top and base of the trapezium.

It will be apparent that this embodiment of the track is offered purely by way of example and that the device in accordance with the invention could equally well be employed in the context of tracks of other form, for example triangular section, rectangular section, ones having a carrier portion presenting a concave aspect to the exterior, and so one, the supply main and the subplenum chambers likewise having any desired right section.

In the accompanying drawings:

FIG. 1 schematically illustrates a transportation system in accordance with the invention, viewed in longitudinal section on the line I–I of FIG. 2;

FIGS. 2 and 3 respectively illustrate sections on the lines II–II and III–III of FIG. 1;

FIG. 4 is a larger scale view of the detail described by the circle A in FIG. 1;

FIG. 5 is a similar detailed view of a variant embodiment;

FIG. 6 is a diagram of the pressure in a subplenum chamber as a function of time, during a cycle of discharge and charge-up; and FIG. 7 is a larger scale section of another detail, described by the circle B in FIG. 1.

The fluid cushion transportation system illustrated in FIGS. 1, 2 and 3, comprises a movable body 1 carrying the payload, which will advantageously be designed to take passengers and move on a track 2 whose right section is in the form of an inverted T with a central guidance rib 3 and wing portions 4 which provide the supporting function. The movable body 1 rests on the track 2 through the medium of a plurality of lift cushions 9 and guidance cushions 10, advantageously defined by skirts 5.

The track 2 is fluidised, that is to say it is designed to supply fluid under pressure and thus establish a layer or cushion of fluid, produced through the medium of discharge nozzles 7 controlled by valves 8 which are normally closed and which open when the movable body 1 passes over.

The fluidic track 2 with its discharge nozzles 7 controlled by the valves 8 is designed in accordance with the invention to present subplenum chambers 6 arranged in succession along it and communicating in each case with a group of nozzles 7, as FIG. 1 clearly shows. The subplenum chambers 6 are separated, by a partition 51, from a pressure fluid supply main 12 with which they communicate through the medium of calibrated restricted orifices 13 formed in said partition 51, which orifices have the effect of creating a greater or lesser degree of delay in recovery of pressure in the subplenum chamber 6 after discharge therefrom. The main 12 receives pressurised fluid from compressors 15 or compressor stations set up at intervals along the track and connected to the main 12 through branch pipes 14.

The subplenum chambers 6 are separated from one another by transverse partitions 16 containing an orifice 21 which can be closed off by a valve 18 of nonreturn type, so mounted as to permit flow of fluid from one subplenum chamber to the other in the direction of displacement F of the movable body 1, and to prevent flow in the opposite direction.

A similar kind of arrangement is provided in the main 12, which is subdivided into successive segments by transverse partitions 17 through which orifices 22 are formed, these orifices being controlled by valves 19 which open in the direction of travel F. It will be noted that each subplenum chamber 6 is associated with a section of main 12, and that here the transverse partitions 16 and 17 are at the same level.

The nozzles 7 supplying the pressurised fluid cushions will advantageously be inclined slightly in relation to the supporting section 4 of the track 2, in order to produce jets which have a horizontal propulsion component parallel to F. These jets act on blades 24 fixed by means of profiled section 23 to the frame of the movable body 1 and inclined substantially in accordance with the direction of the relative velocity, which is the resultant of the velocity of discharge of the fluid from said nozzles and the velocity of forward movement of the movable body. These blades have two lateral walls 25 and 26 substantially parallel with one another and inclined in the indicated direction, as well as a base wall 26 fixed transversely of the walls 25 and 26 and against which the jets issuing from the nozzles 7 react. The wall 27 (see FIG. 3) has a section and plan form substantially in the form of two circular arcs, one end being common and the other being extended in order to define in relation to the walls 25 and 26, a space which is open opposite the supporting portion 4 of the track 2.

Guidance cushions 10 for the movable body 1, which cooperate with the central rib 3 of the track 2, can be supplied through nozzles 28 (see FIG. 2) formed inside said central rib 3 and normally closed off by a valve 29, which automatically opens on passage of the movable body. These nozzles 28 can also be slightly inclined in the direction of forward movement F of the movable body 1.

In a variant embodiment, part of the fluid deflected by the base wall 27 of the base 24 can be tapped off in order to feed the guidance cushions 10. In this case, no tapoff facility in the subplenum 6 for the nozzles 28 is necessary in order to form these cushions.

It is even possible, in the reverse way, to provide for the supplying of the fluid cushions from the central rib 3. In this case, said rib will contain nozzles which supply fluid for the propulsion of the movable body, cooperating with deflector blades which are secured to said body. The supporting of the machine will then be achieved by recirculating the fluid used for the propulsion facility and directing it into enclosures defining cushions 9 for the lift function.

The system in accordance with the invention is not tied to any particular design on the part of the valves 8 or 29. It is merely necessary for them to have a suitable design for the particular function, and they may for example be solenoid valves of known kind which open under the influence of a magnetic field created by the movable body. Preferred embodiments of valves will, however, be described hereinafter in relation to FIGS. 4 and 5.

In FIG. 4, there is shown a valve 8 or 29 in accordance with the invention which is located in the subplenum and cooperates with a seating 31 surrounding the entry orifice of a nozzle 7 formed in the supporting portion 4 of the track. This valve 8 is fixed to the extremity of a lever 32 whose other extremity is articulated at 34 to a bracket 33. A spring 35, operating in compression, forces the valve 8 against its seat 31. The lever 32 is articulated at the other end to a rod 36 passing through the supporting portion 4 in a bore 39 and fixed at its other end to a diaphragm 37, the edge of which is secured to the supporting portion 4 and defines therewith a chamber 41. Seals 38 ensure that there is no leakage between the subplenum 6 and the chamber 41, the latter advantageously communicating with the atmosphere through a valve 41a formed in the supporting track portion 4.

The chamber 41, which forms a protuberance, can be recessed into a location formed in the supporting portion 4, the diaphragm 37 then being flush with the surface of said supporting portion.

In the variant embodiment shown in FIG. 5, the rod 36 acts upon the lever 32 through the medium of a dashpot 42 communicating with the subchamber 6 through a calibrated orifice 43. Moreover, a spring 44 determines the static position of the diaphragm 37.

The superatmospheric pressure of the cushions of pressurised fluid, which lift or guide the movable body by ground effect, is applied to the external face of the diaphragm 37, whose other face is at atmospheric pressure across the vent 41a, this producing a collapsing movement on the part of the diaphragm 37 and, through the medium of the rod 36 and the dashpot 42, the pivoting of the lever 32 which opens the valve 8. The dashpot 42 can be considered, at least at the commencement of displacement, as being rigid if the orifice 43 is sufficiently small. The spring 35 closes the valve again after the superatmospheric pressure created by the pressurised fluid cushions has disappeared.

If, for some reason or other, the movable body is halted of the track, the valve 8 automatically closes in order to prevent any unnecessary loss of fluid, this by collapse of the dashpot 42, which bleeds through the orifice 43. Restarting of the system in this case effected manually by operating a linkage (not shown) which opens the valve 8.

The operation of the transportation system just described is as follows.

Compressors 15 arranged at intervals along the track 2, supply, through respective branch pipes 14, the segments of the fluid pressure supply main 12 which, across the jets 13, fill the subplenum chambers 6 to a suitable superatmospheric pressure. These compressors are started and stopped in accordance with the pressure level in the subplenum chambers. The pressure is balanced in the various segments 12 and subplenum chambers 6, due to the provision of valves 18 and 19 so mounted that the direction of displacement of the fluid is the same as that F of the movable body 1, as explained hereinbefore. In this way, any development of superatmospheric pressure behind a movable body, i.e. a pressure buildup of the kind which could cause an acceleration to be applied to the succeeding body so that it catches up the first one and causes an accident, is avoided. On passage of a movable body, the valves 8 and 29 open and the respective nozzles 7 and 28 deliver jets of fluid which lift and guide the body and, through interaction between the jets and the deflector blades, also propel it.

These jets are disposed substantially to either side of the ridge 45 formed by the common extremity of the base walls 26, and are guided by these walls, reacting therewith. The flow of fluid can likewise take place through lateral vents or moving flaps 46 (FIG. 2) or again, as described hereinbefore, the fluid may be used to supply other cushions of pressurised fluid.

The time of operation of the subplenum chambers 6 in which fluid is stored is a function of their volume and of the pressure maintained there, but at any rate the time of discharge $t1$ (see FIG. 6) corresponds to the phase of supply of the cushions and is substantially less than the time of refilling $t2$ because of the calibrated restricted orifices 13, which have a total area less than the total area of the nozzles 6 and accordingly restrict the introduction of fluid.

The risk of collision between different movable bodies is thus eliminated since the flow of fluid delivered in respect of a succeeding movable body which is too close, is less than that delivered for the preceding body and this therefore determines the minimum interval which can occur between two such bodies.

The transportation system in accordance with the invention is equally suitable for operation of individual movable bodies and for trains of such bodies formed by the coupling together several individual bodies, such coupling being achieved by the engagement of a coupling head 47 (see FIG. 1) in a female taper 48.

It will be clear that when several movable bodies are coupled together to form a train, the pressure in the subplenum chambers 6 will drop off the more, the greater is the number of bodies in the train.

FIG. 6 illustrates the diagrams a, b, c plotting the pressure P in the subplenum chamber 6 as a function of time t, during discharge and recharging phases, the plots relating respectively to the case of a single movable body, to two coupled movable bodies and to three coupled movable bodies.

One improvement provided by the invention makes it possible to achieve a charging time τ which is substantially constant whatever the number of movable bodies coupled together, or in other word whatever the pressure drop Δ P in the subplenum.

To this end, the calibrated restricted orifice 13 formed in the wall 51 separating the pressure fluid supply main 12 and the subplenum 6, is replaced by a variable-area restricted orifice 13a the area of which is a function of the maximum pressure difference between the main 12 and the subplenum 6.

FIG. 7 illustrates the design of a suitable valve arrangement of this kind. It comprises an orifice 50 formed in the wall 51 and traversed by a preferably tapered needle 52 fixed to the wall by arms 53. Peripherally around said orifice, and at the side facing the subplenum 6, a casing 54, for example cylindrical, is provided which, on a ring 60, carried two dashpots 55 and 56 located one inside the other which, with the aid of another ring 57, define an annular chamber 58. The ring 57, guided in its movement by rods 65, cooperates with the needle 52 in order to form a variable-area orifice 59. The annular chamber 58 communicates with the subplenum 6 through orifices 61 closed off by nonreturn valves 62 which nevertheless contain restricted orifices 63.

The operation of this valve arrangement is as follows:

Accordingly as one or several coupled movable bodies pass over a subplenum 6, the latter exhausts to a greater or lesser extent in accordance with the diagram of FIG. 6, creating a pressure difference Δ P of greater or lesser magnitude between the subplenum 6 and the main 12.

If the pressure difference Δ P is small (for example only a single movable body is passing), the dashpots 55 and 56 do not compress very much in displacing the fluid contained in the annular chamber 58 through the orifices 61. The refilling of this chamber, on the other hand, takes place slowly across the restricted orifices 63 in the valves 62. The orifice 59 undergoes only a slight variation in area during the refilling phase. The time of charging can be calculated so that it is equal to τ. On the other hand, if the pressure difference Δ P' is large (for example a train made up of three movable bodies is passing) the dashpots 55 and 56 are radically compressed. The ring 57 therefore defines in relation to the needle 52 an orifice 59 of substantially larger area than heretofore, but this orifice will likewise undergo only a light variation in area during the refilling phase. Thus, a charging time τ for the subplenum is obtained, which is substantially the same as before.

It will be noted that the hollow trapezoidal section of the fluidic track, clearly illustrated in FIG. 2, gives the track qualities of lightness, rigidity and stability. It enables the profiled elements to be prefabricated and assembled easily on site, but above all it exploits the hollow sections to form in two superimposed levels, the subplenum chambers 6 and the pressure fluid supply main 12.

This track can be buried in the ground as shown in FIG. 2, but can equally well be of overhead design and be supported on pylons.

I claim:

1. A fluidic track for ground effect transportation comprising an operative track surface, a multiplicity of valve-controlled discharge nozzles opening on said track surface, and a pressure fluid supply main extending along said track surface, wherein the improvement comprises a succession of pressure fluid supply subplenums communicating with said nozzles for discharge of pressure fluid from said subplenums through said nozzles upon opening of the control valves thereof, and throttled passage means between said supply main and said subplenums for hindered recharge of said subplenums with pressure fluid from said supply main.

2. Track as claimed in claim 1, designed for one-way traffic direction, wherein said subplenums are in a succession along said direction, said track further comprising means connecting successive subplenums to each other, and check valving means in said connecting means for allowing direct flow from one subplenum to the next successive subplenum in said direction and impeding reverse flow opposite to said direction.

3. Track as claimed in claim 2, wherein said supply main is subdivided into a succession of sections along said direction, said track comprising means connecting successive sections to each other, and check valving means in said connecting means for allowing direct flow from one section to the next successive section in said direction and impeding reverse flow opposite to said direction.

4. Track as claimed in claim 3, wherein each section of said supply main is in communication relationship through said throttled passage means with a respective subplenum.

5. Track as claimed in claim 4, wherein said sections and the respective subplenums are coextensive.

6. Track as claimed in claim 1, wherein said track surface, said subplenums and said supply main overlie each other in a compact assembly, said track surface extending at a top level, said subplenums at an intermediate level, and said supply main at a bottom level.

7. Track as claimed in 6, wherein said compact assembly is formed of hollow shaped elements having an exposed upper surface forming said track surface, and two inner superposed coffers separated by a partition: an upper coffer forming said subplenums and a lower coffer forming said supply main, said throttled passage means being positioned through said partition.

8. Track as claimed in claim 7, wherein said elements are of generally trapezoidal cross section with said track surface forming the top minor base of the trapezoid, and said partition being intermediate said minor base and the bottom major base of said trapezoid.

9. Track as claimed in claim 1, wherein said recharge throttled passage means comprise restricted orifices designed, in respect of said discharge nozzles, for obtaining a subplenum recharge time substantially longer than the subplenum discharge time.

10. Track as claimed in claim 9, wherein said restricted orifices have a calibrated area.

11. Track as claimed in claim 9, wherein said restricted orifices have a progressively variable area, said track further comprising means for adjusting the area of said restricted orifices.

12. Track as claimed in claim 11, wherein said area adjusting means comprise differential pressure sensing means responsive to the difference between the pressures obtaining respectively in said supply main and said subplenums, said area adjusting means operating to increase the respective orifice area upon an increase in said pressure difference being sensed, and conversely.

13. Track as claimed in claim 12, wherein said differential pressure sensing means is designed, in respect of said variable-area orifices, for obtaining a substantially constant subplenum recharge time irrespective of the magnitude of the subplenum discharge.

14. Track as claimed in claim 12, wherein said area adjusting means comprises a needle and a ported diaphragm movable with respect thereto and cooperating therewith to define said variable-area orifice, and said differential pressure sensing means comprises a bellows operatively connected with said diaphragm.

15. Track as claimed in claim 1, wherein each subplenum communicates with a plurality of grouped discharge nozzles to constitute a pressure fluid supply manifold therefor.

16. Track as claimed in claim 15, designed for one-way traffic direction, wherein said grouped discharge nozzles are substantially parallel to each other and directed angularly upwardly and forwardly in said direction.